(12) United States Patent
Helfrich et al.

(10) Patent No.: US 6,505,850 B2
(45) Date of Patent: Jan. 14, 2003

(54) AIRBAG COVERING CAP COMPRISING A SUPPORT LAYER AND A COVER LAYER OF DIFFERENT ELASTICITIES

(75) Inventors: Rudolf Helfrich, Aschaffenburg (DE); Norbert Vath, Esselbach (DE); Thomas Klein, Mainaschaff (DE); Bernhard Kress, Hösbach (DE); Norbert Wolleb, Aschaffenburg (DE); Tomás Sieira, Vigo (ES); Hans Martin Hauck, Darmstadt (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 09/403,471

(22) PCT Filed: Mar. 13, 1998

(86) PCT No.: PCT/DE98/00808

§ 371 (c)(1),
(2), (4) Date: Dec. 29, 1999

(87) PCT Pub. No.: WO98/49033

PCT Pub. Date: Nov. 5, 1998

(65) Prior Publication Data

US 2002/0024199 A1 Feb. 28, 2002

(30) Foreign Application Priority Data

Apr. 28, 1997 (DE) .......................... 197 18 931

(51) Int. Cl.⁷ .............................................. B60R 21/16
(52) U.S. Cl. ................ 280/728.3; 280/731; 280/732
(58) Field of Search ........................... 280/728.1, 728.2, 280/728.3, 731, 732

(56) References Cited

U.S. PATENT DOCUMENTS

| | | | | |
|---|---|---|---|---|
| 3,756,617 A | * | 9/1973 | Brown | 280/732 |
| 4,989,896 A | * | 2/1991 | DiSalvo et al. | 280/732 |
| 5,316,822 A | * | 5/1994 | Nishijima et al. | 280/732 |
| 5,335,935 A | * | 8/1994 | Proos et al. | 280/732 |
| 5,501,890 A | * | 3/1996 | Mills | 280/728.3 |
| 5,536,037 A | | 7/1996 | Cherry | 280/728.3 |
| 5,698,283 A | * | 12/1997 | Yamasaki et al. | 280/728.3 |
| 5,741,025 A | * | 4/1998 | Meyer et al. | 280/728.2 |
| 5,772,240 A | * | 6/1998 | Vavalidis | 280/728.3 |
| 5,779,262 A | * | 7/1998 | Totani et al. | 280/728.3 |
| 5,913,534 A | * | 6/1999 | Klingauf | 280/728.3 |
| 5,957,483 A | * | 9/1999 | Mitenberger et al. | 280/728.3 |
| 5,979,931 A | * | 11/1999 | Totani et al. | 280/728.3 |
| 5,997,030 A | * | 12/1999 | Hannert et al. | 280/728.3 |

FOREIGN PATENT DOCUMENTS

| | | |
|---|---|---|
| DE | 44 24 686 A1 | 1/1995 |
| DE | 195 16 230 A1 | 11/1996 |
| EP | 0 428 935 A2 | 5/1991 |
| EP | 0 487 753 A1 | 6/1992 |
| GB | 2 270 884 A | 3/1994 |
| JP | 2-303949 * | 12/1990 |
| JP | 5-294196 * | 11/1993 |
| JP | 6-51024 | 7/1994 |
| WO | WO 95/24328 | 9/1995 |

* cited by examiner

*Primary Examiner*—Brian L. Johnson
*Assistant Examiner*—Christopher Bottorff
(74) *Attorney, Agent, or Firm*—Foley & Lardner

(57) ABSTRACT

An airbag covering cap including a support layer and a covering layer of different elasticities, having at least one tear-off line along which the airbag covering cap tears open when the airbag is deployed. The covering layer is weakened by a groove in the region of the tear-off line and the support layer extends into this groove. The covering layer has a section adjacent to the section of the support layer, which extends into said support layer. The edge between the sections of the support and covering layers, each extending into the other layer is configured as a tear-off edge.

12 Claims, 3 Drawing Sheets

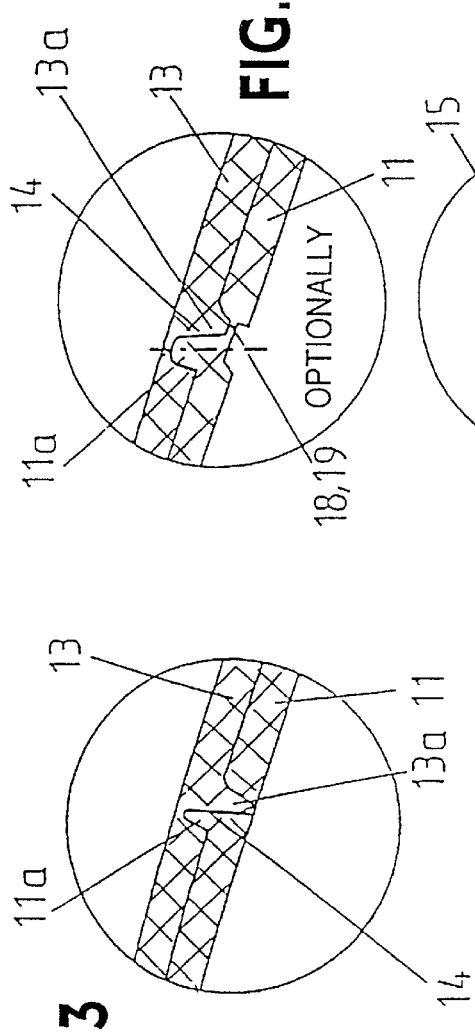
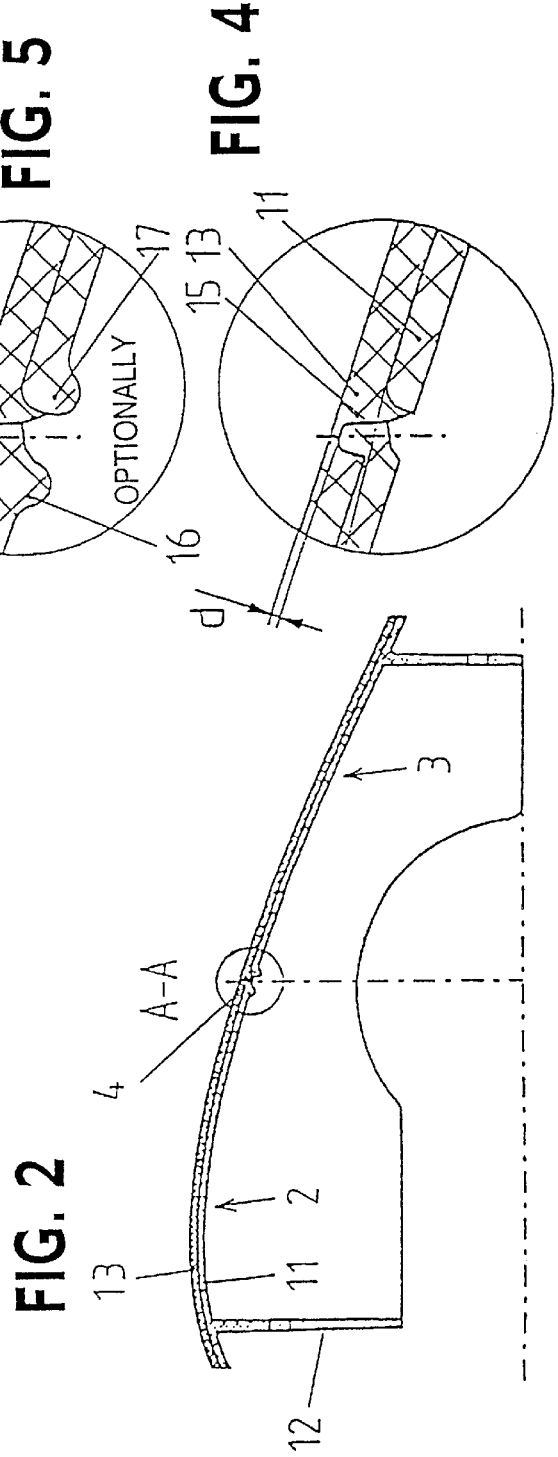

AIRBAG COVERING CAP COMPRISING A SUPPORT LAYER AND A COVER LAYER OF DIFFERENT ELASTICITIES

BACKGROUND OF THE INVENTION

The invention relates to an airbag covering cap comprising a support layer and cover layer of different elasticities.

From DE 195 16 230 an airbag cover is known which consists of a molded part as the support layer and a visible covering which covers the molded part to form the cover layer. The cover layer is formed as a leather coating with a groove-like partial reduction in the material thickness into which the support layer is stretched. At this point an ideal break point is formed in the support layer and the path of the break point corresponds to that of the groove of the cover layer, i.e., the ideal break points in the support and cover layer overlap one another.

Through rear injection of the cover layer, molded into the groove, it happens that there is no material reduction which can be seen on the visible side of the sight cover and a smooth surface is produced on the visible side of the cover layer. Ornamental grooves, such as are provided in the event of weakening the upper side of the cover layer are therefore not required.

With this covering, as with other known coverings having weakened lines, it is intended that the cover tears open along the weakened lines in the event of a crash. Tearing open should however not continue over the end of the weakened lines. The drawback with the known covering described above is that further tearing beyond the end of the groove cannot be ruled out.

In order to prevent further tearing it is known to provide a small opening at the end of the groove whereby the opening-has a larger diameter than the width of the break line. This however has the drawback that the surface of the cover is broken so that the appearance is impaired.

Furthermore it is known from DE 44 24 6586 A1 to design the end sections of the break line curved so that further tearing beyond the end of the break line is likewise to be prevented.

All the known covering caps have the drawback that the opening and tearing force cannot be changed without changing the optical and/or mechanical properties of the covering cap. If the groove is indented for example to reduce the tear-open force, then the risk of further tearing at the ends is increased.

SUMMARY OF THE INVENTION

The object of the invention is to, in the case of an airbag covering cap having a smooth cover surface layer, allow the cap to tear open at a lower force without the cap continuing to tear further over the end of the proposed break line, and to change the opening and further tearing force without changing the optical and/or mechanical properties.

The airbag covering cap of the present invention includes a support and a cover layer of different elasticity with at least a tear-off line along which the airbag covering cap tears open as the airbag is deployed, wherein the cover layer is weakened in the area of the tear-off line through groove and the support layer extends into this groove, and wherein the cover layer has, adjoining the section of the support layer which extends into the groove, a section which extends into the support layer, whereby the edge between the sections of the cover layer and support layer each extend into the other layer, forming a tear-off edge.

As opposed to the known airbag covers, both the support layer and the cover layer have a reinforced section in the area of the break point. Between these two sections stretches a tear-off edge running through both layers, i.e., this tear-off edge is, seen in cross-section, substantially longer than with the known covering caps. The covering cap, in the event of a crash, tears open along this tear-off edge starting from the weakened lines above the groove in the cover layer, whereby the adhesion between the material of the support and the cover layer is slight along the tear-off edge. The reinforced sections and the extended tear-off edge on the one hand prevent the airbag covering cap from tearing open further at the end of the groove of the cover layer and on the other hand ensures in addition that the airbag covering cap tears open along the proposed line.

In one embodiment, the support layer is designed weaker in the area of the tear-off edge between the sections of the support and covering layers compared to the remaining areas and the cover layer extends into the weakened area. With this embodiment both the cover layer and the support layer are formed continuous in the area of the tear-off edge. The airbag cover tears open in the event of a crash both at the weakened points of the cover layer and of the support layer and along the tear-off edge between the two layers.

In a further embodiment, it is proposed that the support layer has in the area of the tear-off edge between the sections of the support and cover layers at least one slit and that the cover layer extends at least partially into the slit. With this embodiment the support layer is formed non-continuous in the area of the tear-off edge. Thus with this embodiment in the event of a crash the airbag cover must only tear in at the weakened point of the cover layer. It then tears open again along the tear-off edge between the support and cover layer.

In a third embodiment, a slit is likewise provided which is however bridged by thin narrow webs. The webs preferably have a width of 0.8 mm maximum and are arranged at intervals of at least 10 mm.

The thickness of the cover layer above the section of the support layer extending into the cover layer preferably increases towards the ends of the tear-off areas whereby further tearing of the cover cap can be affected.

In a further design of the second embodiment, it is proposed that the edge of the slit in the support layer is reinforced like a bead. A reinforcement of this kind is likewise possible with the first embodiment at the edges of the weakened area in the support layer. It is thereby further ensured that the airbag cover does not tear open apart from the proposed tear-open areas.

It is expedient if the tear-off edge runs inclined relative to the surface of the cover layer and the support layer in this area. By changing the inclined path and the path of the tear-off edge in cross-section it is possible to adjust the initial tearing and further tearing forces without changing the optical or mechanical properties. The tear-off edge preferably runs straight in cross-section but can also run angled in a straight line or curved.

The reduced adhesion provided between the support and cover layer at the tear-off edge can be achieved by selecting suitable materials for the support and cover layer whereby the adhesion is also reduced in the remaining areas. The reduced adhesion can also be achieved by surface treating the support layer in this area prior to applying the cover layer.

It is expedient to use thermoplastics elastomers as the support layer and cover layer.

The invention will now be explained with reference to the embodiments shown in the drawings in which:

DESCRIPTION OF THE DRAWINGS

FIG. 2 is a sectional view through the covering cap along line A—A of FIG. 1;

FIGS. 3–6 show different embodiments of the tear-off area of the covering cap in an enlarged view of the detail marked by a circle in FIG. 2;

DETAILED DESCRIPTION OF THE INVENTION

Figure 1:
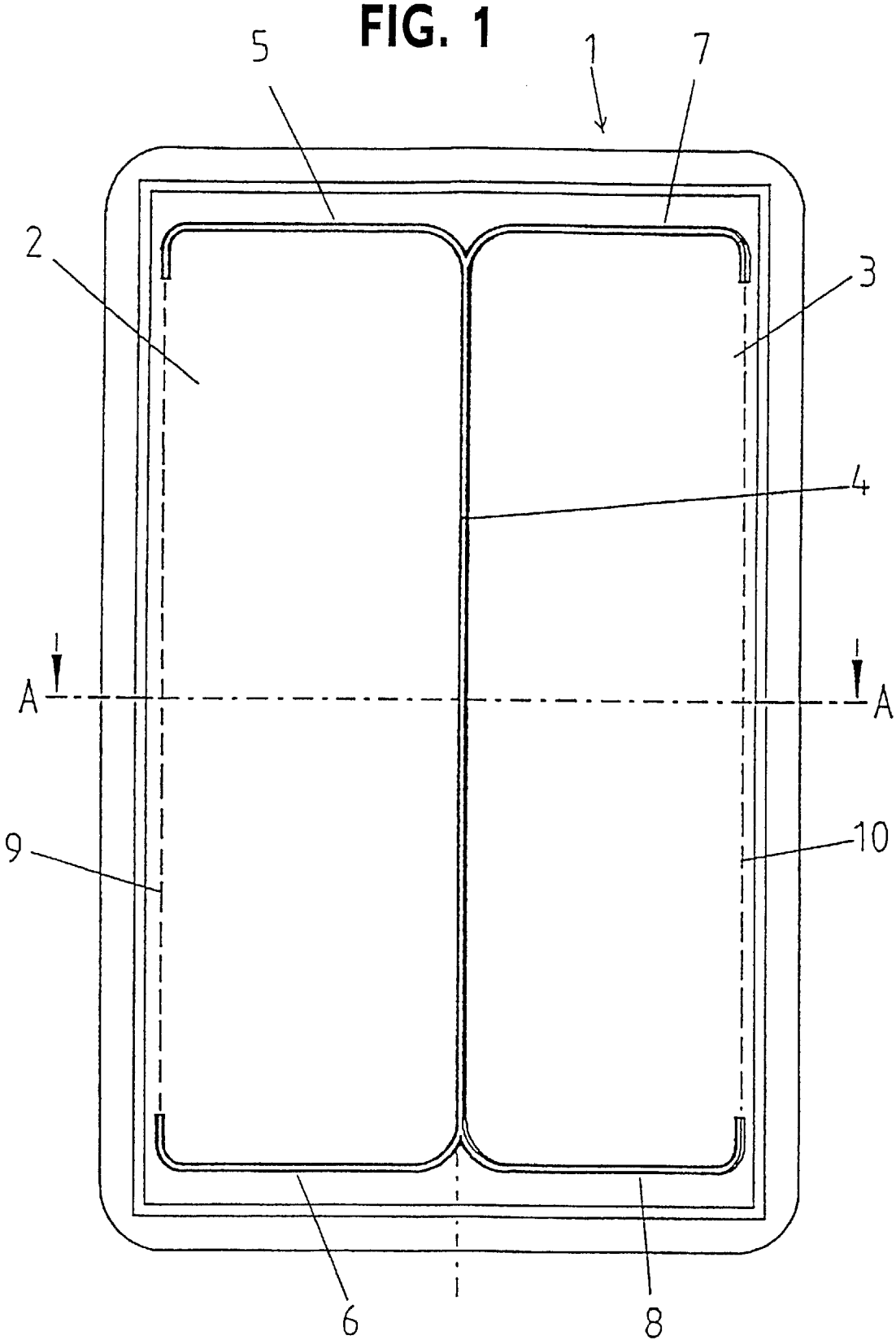
FIG. 1 is a view of the underneath of a covering cap.

The covering cap 1, shown in FIG. 1, tears open into two parts in the event of a crash. To this end two folding areas 2, 3 are provided which have in the center of the covering cap a common tear-off area 4. At the ends there are separate tear-off areas 5, 6 and 7, 8 which open into hinge-like sections 9, 10 which are designed, in a known way, for example, as film hinges and are not shown in detail.

It can be seen from FIG. 2 that the covering cap has a support layer 11 with an edge 12 and that a cover layer 13 is provided over the support layer 11. Both preferably consist of plastic whereby the material of the cover layer is softer than the material of the support layer. The cover layer 13 has a continuous surface while it is designed on the underneath in the manner according to the invention.

In a first embodiment which is shown on an enlarged scale in FIG. 3, the cover layer has in the tear–off areas 4–8, a groove into which a section 11a of the support layer extends. The support layer has in the tear-off areas 4–8, a slit, i.e., the folding areas 2, 3 are separated from each other in the support layer. A section 13a of the cover layer 13 extends into this slit. A tear-off edge 14 runs between the two sections 11a and 13a. In the present embodiment, this tear-off edge runs in a straight line in cross-section and extends practically through the entire support and cover layers. The support and cover layers receive increased strength in the area of this tear-off edge 14 through the reinforced sections 11a and 13a so that further tearing at the ends of the tear-off areas 5–8 which adjoin the hinge-like sections 9, 10 is prevented. Furthermore by changing the incline of the tear-off edge 14 it is possible to affect the force required for initially tearing and further tearing the cover cap without changing the optical and mechanical properties of the tear-off area, i.e., both the continuous surface of the cover layer 13 and also the reinforced sections 11a and 13a remain.

The thickness, d, of the cover layer 13 above the section 11a preferably amounts to a few tenths of a millimeter and at the ends of the tear-off areas 5–8 to about one millimeter.

During inflation, the support layer 11 and the cover layer 13 expand differently as a result of unequal elasticity. The cover material tears in over the reinforced section 11a of the support layer 11 and becomes detached from the support material along the inclined tear-off edge 14. The adhesion between the support and cover layers is, however, so great on the other side that the two layers remain joined together during tearing of the covering cap in the remaining areas so that the covering cap tears open completely.

With the embodiment of FIG. 4 there is a different path for the tear-off edge compared with the embodiment of FIG. 3. In cross-section this tear-off edge 15 runs straight with angles, i.e., it has two sections which run at different angles relative to the surface of the covering cap.

A modification of the embodiment of FIG. 4 is shown in FIG. 5. There the support layer has in the area of the tear-off edge 15 bead-like reinforcements 16, 17.

The process of the further tearing along the tear-off edge 15 is thereby further improved.

Figure 7:
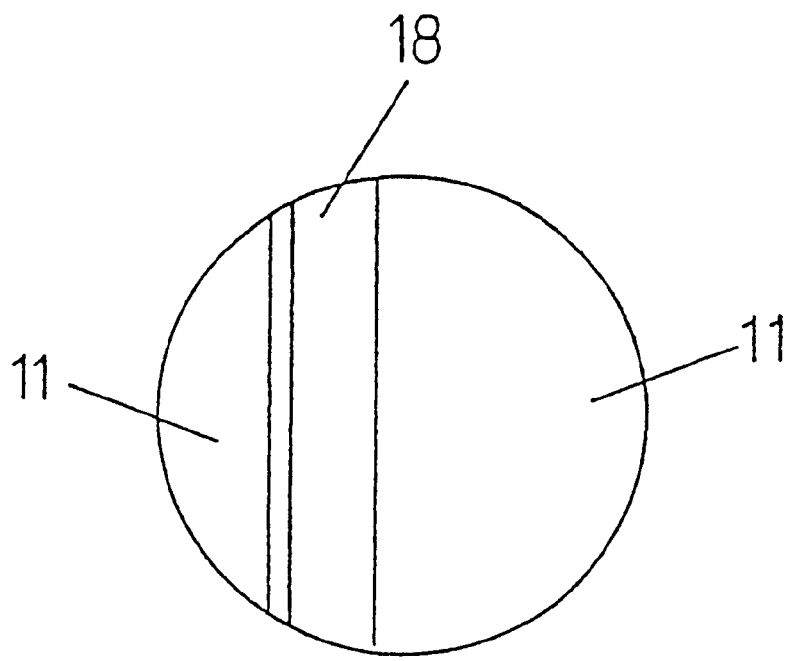
FIG. 7 shows a view from below of the detail of FIG. 6 with a continuous web.
Figure 8:
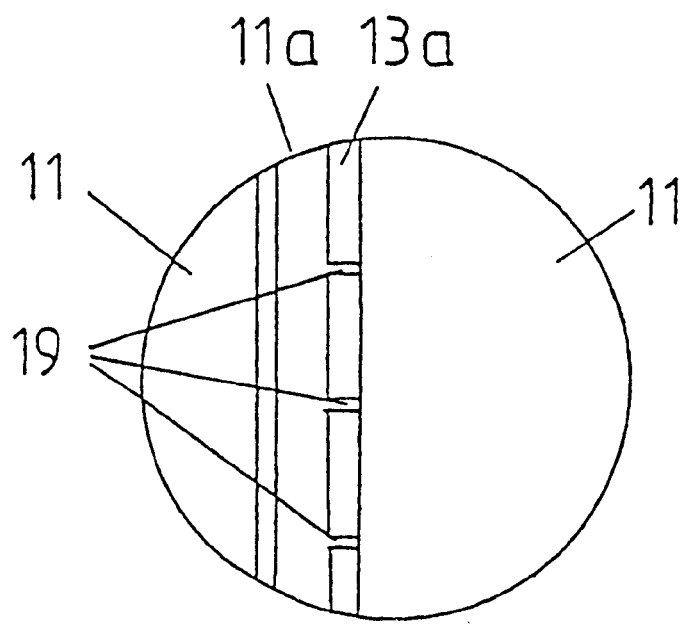
FIG. 8 shows a view from below of the detail of FIG. 6 with several narrow webs.

In FIG. 6, the two embodiments of FIGS. 7 and 8 are shown in cross-section. With the embodiment of FIG. 7 the support layer 11 has no slit in the area of the tear-off edge but a weakening in the material so that a web 18 remains. In the present embodiment the weakening has been provided on both sides. The weakened section 13a of the cover layer 13 extends into the weakened area of the support layer up to the web 18. The web has such a width that despite the different elasticities of the support and cover layer it tears open together with the cover layer above the reinforced section 11a.

In the embodiment of FIG. 8 the support layer 11 has a slit which is bridged by webs 19 which extend from one side of the support layer 11 to the other side. The reinforced section 13a can thus be seen in FIG. 8 between the webs 19.

What is claimed:

1. An airbag covering cap comprising:

a support layer and a cover layer of different elasticities, wherein the support has at least one tear line, wherein the cover layer has a groove forming a weakened area along the tear line, wherein the support layer has a support layer section that extends into the groove, wherein the cover layer has a cover layer section that extends into the support layer, adjacent to the support layer section, and along the tear line, wherein an edge formed between the support layer section and the cover layer section forms the tear line, and wherein the support layer has at least one slit along the tear line and wherein the cover layer section extends at least in part into the at least one slit, and further including a plurality of thin narrow webs bridging the slit.

2. An airbag covering cap according to claim 1, wherein the webs have a width of 0.8 mm maximum and are arranged at intervals of at least 10 mm.

3. An airbag covering cap a support layer and a cover layer of different elasticities, wherein the support has at least one tear line, wherein the cover layer has a groove forming a weakened area along the tear line, wherein the support layer has a support layer section that extends into the groove, wherein the cover layer has a cover layer section that extends into the support layer, adjacent to the support layer section, and along the tear line, wherein an edge formed between the support layer section and the cover layer section forms the tear line, wherein the support layer has at least one slit along the tear line and wherein the cover layer section extends at least in part into the at least one slit, and wherein the support layer includes bead-like reinforcements on an edge of the at least one slit.

4. An airbag covering cap comprising:

a support layer and a cover layer of different elasticities, wherein the support has at least one tear line, wherein the cover layer has a groove forming a weakened area along the tear line, wherein the support layer has a support layer section that extends into the groove, wherein the cover layer has a cover layer section that extends into the support layer, adjacent to the support layer section, and along the tear line, wherein an edge formed between the support layer section and the cover layer section forms the tear line, wherein the support layer is weaker along the tear line than the remaining area thereof, and wherein the support and cover layers have reduced adhesion at the tear line.

5. An airbag covering cap according to claim 4, wherein the support layer has a plurality of tear lines, each having ends where the thickness (d) of the cover layer section, above the support layer section extends into the cover layer, increases.

6. An airbag covering cap according to claim 4, wherein the tear line is inclined along opposite surfaces of the cover layer section and support layer section.

7. An airbag covering cap according to claim 4, wherein the tear line, viewed in cross-section, runs in one of a straight line, angled in straight lines, or curved.

8. An airbag covering cap according to claim 4, wherein the support and cover layers comprise thermoplastic elastomers.

9. An airbag covering cap according to claim 4, wherein said support layer is formed with an open slit which extends along the tear line from an inboard surface toward the cover layer and which renders the support layer weaker along the tear line.

10. An air bag covering cap according to claim 9, further comprising a thin narrow web which bridges and closes the open slit.

11. An air bag covering cap comprising:

a support layer and a cover layer of different elasticities, wherein the support has at least one tear line, wherein the cover layer has a groove forming a weakened area along the tear line, wherein the support layer has a support layer section that extends into the groove, wherein the cover layer has a cover layer section that extends into the support layer, adjacent to the support layer section, and along the tear line, wherein an edge formed between the support layer section and the cover layer section forms the tear line, wherein the support layer is weaker along the tear line than the remaining area thereof, and wherein the materials selected for the support and cover layers have mutually reduced adhesion.

12. An airbag covering cap comprising:

a support layer and a cover layer of different elasticities, wherein the support has at least one tear line, wherein the cover layer has a groove forming a weakened area along the tear line, wherein the support layer has a support layer section that extends into the groove, wherein the cover layer has a cover layer section that extends into the support layer, adjacent to the support layer section, and along the tear line, wherein an edge formed between the support layer section and the cover layer section forms the tear line, and wherein the support layer has at least one slit along the tear line and wherein the cover layer section extends at least in part into the at least one slit wherein the slit is a through slit which extends along the tear line and wherein the cover layer section extends at least in part into the at least one slit, and further comprising:

a thin narrow web which bridges and closes the slit.

* * * * *